US011700830B2

(12) United States Patent
Ren et al.

(10) Patent No.: US 11,700,830 B2
(45) Date of Patent: Jul. 18, 2023

(54) PIG PRODUCTION METHOD BY USING DETACHABLE AND WASHABLE WET CURTAIN

(71) Applicant: Jiangsu Academy of Agricultural Sciences, Nanjing (CN)

(72) Inventors: Shouwen Ren, Nanjing (CN); Xuemin Wang, Nanjing (CN); Xiaomin Fang, Nanjing (CN); Bixia Li, Nanjing (CN); Yanfeng Fu, Nanjing (CN); Weimin Zhao, Nanjing (CN); Xiaobo Xu, Nanjing (CN); Li Wang, Nanjing (CN); Feng Tu, Nanjing (CN); Guotai Wu, Nanjing (CN)

(73) Assignee: JIANGSU ACADEMY OF AGRICULTURAL SCIENCES, Nanjing (CN)

( * ) Notice: Subject to any disclaimer, the term of this patent is extended or adjusted under 35 U.S.C. 154(b) by 253 days.

(21) Appl. No.: 17/134,418

(22) Filed: Dec. 27, 2020

(65) Prior Publication Data

US 2021/0298264 A1    Sep. 30, 2021

(30) Foreign Application Priority Data

Dec. 27, 2019    (CN) .......................... 201911372139.8

(51) Int. Cl.
*A01K 1/00* (2006.01)
*F24F 5/00* (2006.01)
(Continued)

(52) U.S. Cl.
CPC ............ *A01K 1/007* (2013.01); *A01K 1/0082* (2013.01); *A01K 1/0218* (2013.01); *F24F 5/0035* (2013.01); *E06B 9/262* (2013.01)

(58) Field of Classification Search
USPC .................................................. 119/445, 448
See application file for complete search history.

(56) References Cited

U.S. PATENT DOCUMENTS

| 2,387,473 | A | * | 10/1945 | Spitzka | ................. | F24F 5/0035 |
| | | | | | | 55/467 |
| 4,389,352 | A | * | 6/1983 | Bohanon, Sr. | ............ | F24F 6/04 |
| | | | | | | 261/106 |

(Continued)

FOREIGN PATENT DOCUMENTS

| CN | 106688898 | * | 5/2017 | ............... A01K 1/00 |
| CN | 108476987 | * | 9/2018 | ............... A01K 1/00 |

(Continued)

*Primary Examiner* — Andrea M Valenti
(74) *Attorney, Agent, or Firm* — Daniel J. Chalker; Edwin S. Flores; Chalker Flores, LLP

(57) ABSTRACT

A pig production method by using a detachable and washable wet curtain for intensive pig farming The detachable and washable wet curtain includes a wet curtain mounting frame (1), a spray tube (4), a plurality of rotatable reels (7) equivalent to sleeves, a reel (6) with a buckle, a wet curtain net (8), a reel (10) with a buckle, and a manual handle (9). The wet curtain is formed by a low-cost common material, namely a plastic net and the like, is convenient to mount, detach, and wash, and is not prone to making dust, scale, algae, mosquitos, and the like accumulate thereon, thus reducing the replacement cost and use cost. Therefore, a new cooling method based on the wet curtain is provided for pig farms in summer, and it is also suitable for other livestock farms in summer.

17 Claims, 2 Drawing Sheets

(51) Int. Cl.
*A01K 1/02* (2006.01)
*E06B 9/262* (2006.01)

(56) References Cited

U.S. PATENT DOCUMENTS

| | | | | | |
|---|---|---|---|---|---|
| 4,476,809 | A | * | 10/1984 | Bunger | A01K 1/0082 |
| | | | | | 119/668 |
| 4,773,471 | A | * | 9/1988 | Grant | A01K 1/0082 |
| | | | | | 165/60 |
| 7,350,364 | B2 | * | 4/2008 | Meerpohl | A01K 1/0082 |
| | | | | | 62/310 |
| 2004/0144110 | A1 | * | 7/2004 | Reeves | A01K 1/0082 |
| | | | | | 62/309 |
| 2006/0208369 | A1 | * | 9/2006 | Hayden | B05B 17/085 |
| | | | | | 261/36.1 |

FOREIGN PATENT DOCUMENTS

| | | | | | |
|---|---|---|---|---|---|
| CN | 210959834 | * | 7/2020 | | A01K 1/00 |
| KR | 20110020885 | * | 10/2011 | | A01K 1/00 |

\* cited by examiner

PIG PRODUCTION METHOD BY USING DETACHABLE AND WASHABLE WET CURTAIN

CROSS-REFERENCE TO RELATED APPLICATIONS

This application claims priority to Chinese Application Serial No. CN 201911372139.8, filed Dec. 27, 2019, the entire contents of which are incorporated herein by reference.

TECHNICAL FIELD

The present disclosure relates to a pig production method by using a detachable and washable wet curtain for intensive pig farming, belonging to the field of animal husbandry.

BACKGROUND

Traditional wet curtains are formed by honeycombs made from special paper. Their operating principle is based on a natural physical phenomenon that heat is absorbed during evaporation of water. That is, water flows through corrugated fiber surfaces of the wet curtains from top to bottom under gravity to form water films. When air flowing fast penetrates through the wet curtains, the water contained in the water films will evaporate by absorbing heat contained in the air, so as to take away a lot of heat. In this way, the air penetrating through the wet curtains is cooled. Therefore, the temperature is lowered.

Wet curtain cooling systems provide a very effective cooling method for a closed space. Currently, the wet curtain cooling systems are installed in pigsties for breeding pigs and pigsties for farrowing in most pig farms. In summer, the wet curtains and draught fans will be used, and ventilation holes and windows will be closed to form a closed environment under a negative pressure. The wet curtain cooling system can effectively cool the pigsties in summer to reduce heat stress in pigs, especially in the breeding pigs. Furthermore, the wet curtain cooling systems are also installed in pigsties for pig nursery and pigsties for pig fattening in some pig farms. However, traditional wet curtain cooling systems are specially required on the aspects of water quality, sun-shade protection, and washing.

(1) Water Quality

It is necessary to use water having good quality for the traditional wet curtain cooling systems formed by the honeycombs made from the special paper. If water having poor quality is used for the traditional wet curtain cooling systems formed by the honeycombs made from the special paper, the service life of the wet curtains will be shortened; and besides, if deposition and blockage are caused, the cooling effect will be affected. The water should be regularly discharged during operation of the traditional wet curtain cooling systems, and can be discharged by about 10% every time if its quality meets the standard. Moreover, water tanks, water supply pipes, and water discharge pipes are required to be cleaned every week.

Requirements on the water quality: extremely low or high pH values will make the wet curtains brittle or soft, and pH values are recommended from 6.5 to 8.5; calcium ($CaCO_3$) having extremely high hardness will deposit on the wet curtains, and the hardness of the calcium is recommended from 20 mg/L to 150 mg/L (from 100 mg/L to 300 mg/L); and the content of suspended solids is recommended to be less than 50 mg/L.

(2) Sun-Shade Protection

Sun-shade panels and sun-shade nets are required to be additionally used during operation of the traditional wet curtains formed by the honeycombs made from the special paper. In this way, direct sunlight is prevented from causing damage to the wet curtains as well as unnecessary evaporation of moisture, so that the service life of the wet curtains is prolonged, and the operational efficiency of the wet curtains is improved; and the blockage of dust, catkins, and the like in the wet curtains can be relieved, so that the wet curtains can be prevented from being directly rinsed, which may otherwise shorten its service lift.

(3) Washing of the Wet Curtains

A way to get rid of scale and algae on the surfaces of the traditional wet curtains formed by the honeycombs made from the special paper is as follows: after being thoroughly dried in the air, the wet curtains are gently brushed top and bottom with a banister brush, and are not brushed horizontally; (the wet curtains can be partially brushed first to check whether they can withstand brushing) and then water supply systems are turned on to wash the scale and algae on the surfaces of the wet curtains (to prevent the wet curtains from being washed with steam or high-pressure water). The wet curtains are washed with detergents first and then rinsed with water; and after the scale and the algae on the wet curtains are removed, water inlet tubes are closed, water pumps are turned off, and filter screens of the water pumps and the water inlet tubes are cleaned. In addition, the water inlet tubes and the wet curtains can be properly disinfected with Sukejing when cleaned. The Sukejing is a safe and drinkable organic acid disinfectant and can effectively remove rust and stains in the water inlet tubes.

(4) Maintenance of the Wet Curtains

Generally, there are much dust in the pig farms and many mosquitoes and flies in the pig farms in summer. They are attached to the surfaces of the traditional wet curtains formed by the honeycombs made from the special paper. After being blocked, the wet curtains have an effective air inlet area greatly reduced. As a result, a wind speed in the pigsties and the cooling effect of the wet curtains will be affected. Because of this, filters and the wet curtains need to be washed semimonthly. The wet curtains are washed as follows: the wet curtains are rinsed with water from thick water pipes first to get rid of sediments, then detergents such as Ouke for the wet curtains are added to pools to remove biological films on the surfaces of the wet curtains, and finally clean water is added to the pools for replacement.

After the wet curtains are used for a period of time, their surfaces are more prone to making the scale and algae accumulate thereon. This will affect the cooling effect of the wet curtains. The traditional wet curtains formed by the honeycombs made from the special paper have certain hardness and thus are difficult to wash. The wet curtains will not be used when blocked seriously, and vacuum cleaners are used to suck the dust and debris on the surfaces and in holes of the wet curtains; meanwhile, air pumps are used to blow air from the internal side of the wet curtains to the outside to improve the cleaning effect. Afterwards, the wet curtains are repeatedly washed with clean water by means of wet curtain circulation systems for thorough disinfection; and then the water curtains are dried in the air to be used. In this way, the water curtain has permeability which is the same as before.

The wet curtains should be maintained well after summer. When the wet curtains are not in use, their paper should be shielded with sun shades to avoid oxidation. Otherwise, the service life of the wet curtains will be shortened.

SUMMARY

Technical Issue

The present disclosure aims to provide a detachable and washable wet curtain which is suitable for intensive pig farming, convenient to mount, detach, and wash, and is not prone to making dust, scale, algae, mosquitos, and the like accumulate thereon, thus reducing the replacement cost and use cost. Therefore, a new cooling method based on the wet curtain is provided for pig farms in summer, and it is also suitable for other livestock farms in summer.

Technical Solution

A pig production method by using a detachable and washable wet curtain is provided, where the detachable and washable wet curtain includes a wet curtain mounting frame 1, a spray tube 4, a plurality of rotatable reels 7 equivalent to sleeves, a reel 6 with a buckle, a wet curtain net 8, a reel 10 with a buckle, and a manual handle 9, where the spray tube 4 on the top of or above the wet curtain mounting frame 1 is connected to a water inlet tube 5; the cuboid wet curtain mounting frame 1 is 10-20 cm wide, rectangular frames are respectively located on the top and bottom as well as left and right sides of the cuboid wet curtain mounting frame 1, and a bottom plate 2 with a V-shaped groove connected to a water outlet 3 is located at the bottom of the cuboid wet curtain mounting frame 1; the reel 6 with a buckle is fixed to two side borders of the top of the wet curtain mounting frame 1; the plurality of rotatable reels 7 equivalent to the sleeves are parallelly arranged on a front face and back face of the wet curtain mounting frame 1, and two ends of each rotatable reel 7 are fixed to two side borders of the front face or the back face; the reel 10 with a buckle has two ends fixed to two side borders of the bottom of the wet curtain mounting frame 1, and is connected to the manual handle 9; an upper end of the wet curtain net 8 is fixed to the reel 6 by means of the buckle of the reel 6; after entering the wet curtain mounting frame 1 from the reel 6 with a buckle, the wet curtain net 8 is alternately wound around the reels 7 and between the front face and the back face, and a lower end of the wet curtain net 8 is fixed to the reel 10 by means of the buckle of the reel 10. Furthermore, the wet curtain mounting frame 1 and the bottom plate 2 with a V-shaped groove are made from aluminium alloys; and trim strips are adopted as the buckles of the reel 6 and the reel 10 to fix the wet curtain. In addition, the wet curtain net is a common plastic net or sun-shade net on the market.

The pig production method by using a detachable and washable wet curtain is provided, including:

(1) mounting of the wet curtain the wet curtain may be mounted in a V shape at an included angle of 10°-20° by means of the reels; one end of the wet curtain may enter the wet curtain mounting frame from the reel 6 with a buckle, pass through the plurality of reels, and finally come out of the reel 10 with a buckle; two ends of the wet curtain may be respectively fixed to the reel 6 and the reel 10 by means of their buckles; and the wet curtain may be tensioned by rotating the manual handle 9; and (2) detachment and washing of the wet curtain the wet curtain may be unbuckled from the reel 6 first, then detached by rotating the manual handle 9, and finally unbuckled from the reel 10 to be removed; and the removed wet curtain may be washed in a pool; and the wet curtain net 8 may be wound around the reels at the included angle of 10°-20°; and an accessary draught fan may be required by the wet curtain for a pig farm; the accessary draught fan and the wet curtain may be respectively located at two ends of a pigsty; the accessary draught fan may suck air from an outside; and the wet curtain may be used to lower the temperature in the pigsty when it reaches 28° C. in summer.

Beneficial Effects:

The detachable and washable wet curtain is a new type wet curtain suitable for current intensive pig farming. It is formed by a low-cost common material, namely the plastic net or sun-shade net. The wet curtain is simple in material selection, convenient to mount, detach, and wash, and is not prone to making dust, scale, algae, mosquitos, and the like accumulate thereon, thus reducing the replacement cost and use cost. The wet curtain in the present disclosure is compared in detail with a traditional wet curtain formed by a honeycomb made from special paper in Table 1.

The wet curtain in the present disclosure has been used for a pig farm in the Lvye Ecological Park in Jingjiang City for a trial, and the effect of the wet curtain in the present disclosure on pig production is compared with that of the traditional wet curtain formed by the honeycomb made from the special paper on the pig production in Table 2. In summer, namely a high-temperature season, the wet curtain in the present disclosure has similar cooling effects, and a temperature difference is only about 1° C.; daily gains of pigs have no obvious difference; and mounting, detachment, washing, and replacement costs of the wet curtain in the present disclosure only account for ½ of those of the traditional wet curtain formed by the honeycomb made from the special paper, and the cost of the wet curtain in the present disclosure only accounts for ⅕ of that of the traditional wet curtain formed by the honeycomb made from the special paper.

DETAILED DESCRIPTION

Figure 1:
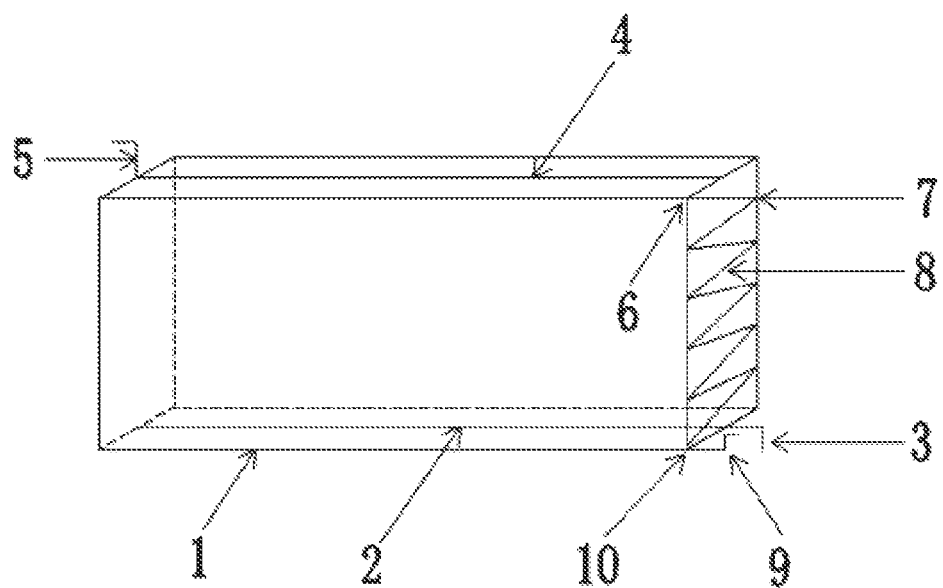
FIG. 1 is a front view of a detachable and washable wet curtain of the present disclosure.

The following elements are depicted in the figures:
1. wet curtain mounting frame;
2. bottom plate with a V-shaped groove;
3. water outlet;
4. spray tube;
5. water inlet;
6. first reel with a buckle;
7. rotatable reel equivalent to a sleeve;
8. wet curtain net;
9. manual handle; and
10. second reel with a buckle.

A pig production method by using a detachable and washable wet curtain is characterized in that:

The detachable and washable wet curtain includes a wet curtain mounting frame 1, a spray tube 4, a plurality of rotatable reels 7 equivalent to sleeves, a reel 6 with a buckle, a wet curtain net 8, a reel 10 with a buckle, and a manual handle 9, where the spray tube 4 on the top of or above the wet curtain mounting frame 1 is connected to a water inlet tube 5; the cuboid wet curtain mounting frame 1 is 10-20 cm wide, rectangular frames are located on the top, left side, and right side of the cuboid wet curtain mounting frame 1, and a bottom plate 2 with a V-shaped groove connected to a water outlet 3 is located at the bottom of the cuboid wet curtain mounting frame 1; the reel 6 with a buckle is fixed to two side borders of the top of the wet curtain mounting frame 1; the plurality of rotatable reels 7 equivalent to the sleeves are parallelly arranged on a front face and back face of the wet curtain mounting frame 1, and two ends of each rotatable reel 7 are fixed to two side borders of the front face or the back face; the reel 10 with a buckle has two ends fixed to two side borders of the bottom of the wet curtain mounting frame 1, and is connected to the manual handle 9; an upper end of the wet curtain net 8 is fixed to the reel 6 by means of the buckle of the reel 6; after entering the wet curtain mounting frame 1 from the reel 6 with a buckle, the wet curtain net 8 is alternately wound around the reels 7 and between the front face and the back face, and a lower end of the wet curtain net 8 is fixed to the reel 10 by means of the buckle of the reel 10. Furthermore, the wet curtain mounting frame 1 and the bottom plate 2 with a V-shaped groove are made from aluminium alloys; and trim strips are adopted as the buckles of the reel 6 and the reel 10 to fix the wet curtain. In addition, the wet curtain net is a common plastic net or sun-shade net on the market.

The pig production method by using a detachable and washable wet curtain is characterized in that:

(1) Mounting of the wet curtain

The wet curtain is mounted in a V shape at an included angle of 10°-20° by means of the reels. One end of the wet curtain enters the wet curtain mounting frame from the reel 6 with a buckle, passes through the plurality of reels, and finally comes out of the reel 10 with a buckle; two ends of the wet curtain are respectively fixed to the reel 6 and the reel 10 by means of their buckles; and the wet curtain is tensioned by rotating the manual handle 9.

(2) Detachment and washing of the wet curtain

The wet curtain is unbuckled from the reel 6 first, then detached by rotating the manual handle 9, and finally unbuckled from the reel 10 to be removed; and the removed wet curtain is washed in a pool.

The wet curtain net 8 is wound around the reels at the included angle of 10°-20°. An accessary draught fan is required by the wet curtain for a pig farm. The accessary draught fan and the wet curtain are respectively located at two ends of a pigsty. The accessary draught fan blows air out of the pigsty; and the wet curtain is used to lower the temperature in the pigsty when it reaches 28° C. in summer.

The pig production method by using a detachable and washable wet curtain in an embodiment is characterized in that:

(1) Structure of the wet curtain

A wet curtain device includes an aluminium alloy frame 1, an aluminium alloy bottom plate 2 (with a V-shaped groove in the middle), a water outlet 3 (a polyethylene (PE) or polyvinyl chloride (PVC) tube with an outer diameter about 25 mm), a spray tube 4 (a PE or PVC tube with an outer diameter about 25 mm), a water inlet 5 (a PE or PVC tube with an outer diameter about 25 mm), a reel 6 with a buckle (a trim strip is adopted as the buckle of the reel 6 to fix the wet curtain, and the rotating shaft is a rotatable sleeve), reels 7 (which are rotatable sleeves), a wet curtain net 8 (equivalent to a commonly known "new material net" made from high-density polyethylene), and a reel 10 with a buckle (a time strip is adopted as the buckle of the reel 10 to fix the wet curtain, and the reel 10 is a rotatable sleeve). In addition, all materials have specifications meeting the national standard.

Figure 2:
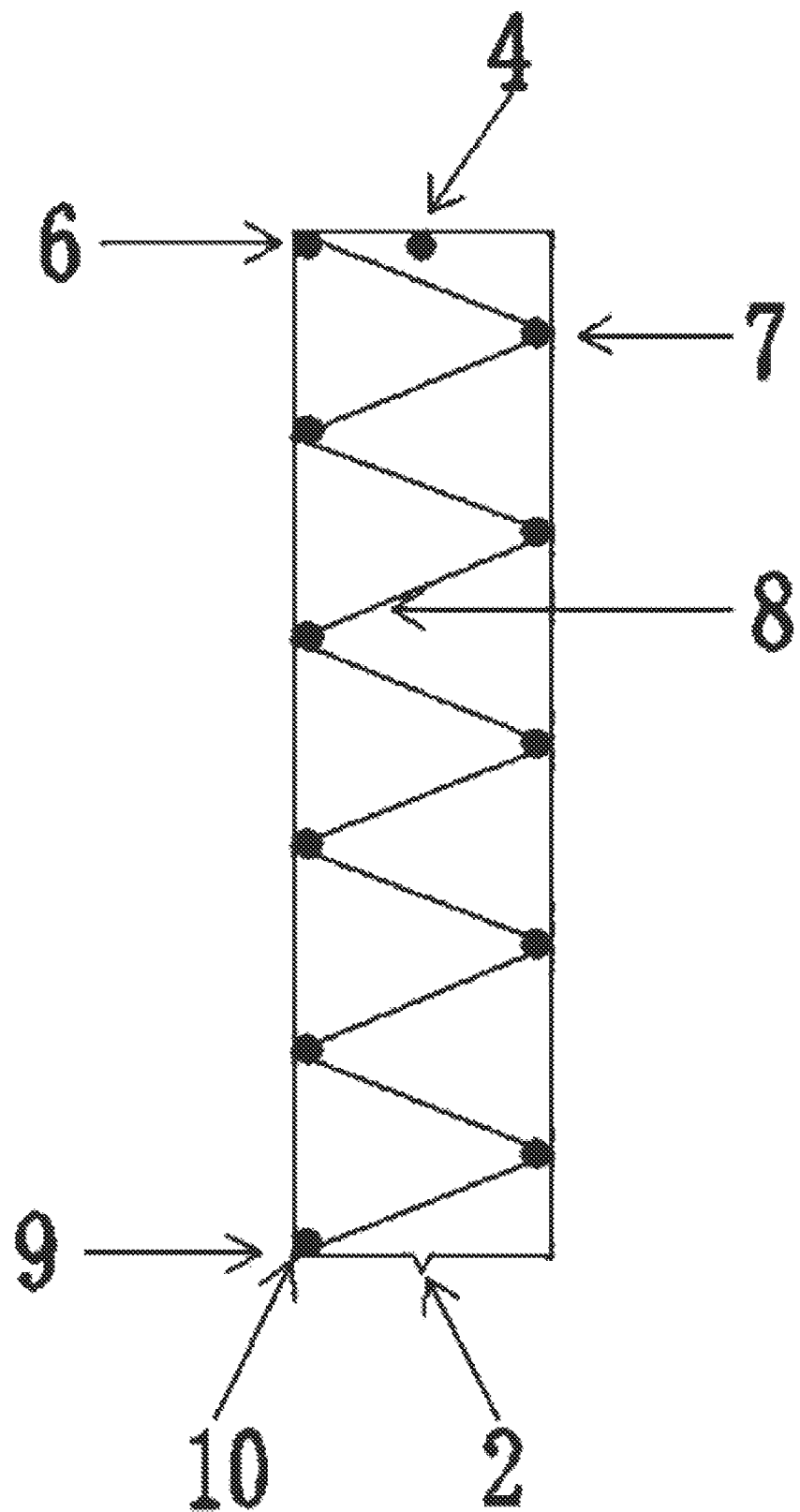
FIG. 2 is right view of the detachable and washable wet curtain of the present disclosure.

As shown in FIG. 1 and FIG. 2, the aluminium alloy frame 1 is 200 cm long, 160 cm high, and 16 cm wide. Water enters the spray tube 4 (fixed in the top of the aluminium alloy frame 1) via the water inlet 5; and the water sprayed from the spray tube flows through the wet curtain net 8, then enters the V-shaped groove in the aluminium alloy bottom plate 2, and finally flows out of the water outlet 3. The rotating shaft 6 with a buckle, the rotating shafts 7, the rotating shaft 10 with a buckle, and the manual handle 9 are used to fix the wet curtain; one end of the wet curtain enters the aluminium alloy frame 1 from the reel 6 with a buckle, passes through a plurality of reels 7 fixed in the aluminium alloy frame 1, and finally comes out of the reel 10 with a buckle (used to fix the wet curtain), where the wet curtain is wound around the reels at an included angle of about 15°; and the wet curtain is tensioned by rotating the manual handle 9 connected to the reel 10 with a buckle.

(2) Material selection of the wet curtain

A common plastic net or sun-shade net, namely the commonly known "new material net" made from the high-density polyethylene, is selected to form the wet curtain; it is better to adopt a three-strand net or four-strand net (there are three wefts within one inch in the three-strand net and four wefts within one inch in the four-strand net). There are many brands, such as Courtyard Flower, Deteng, Xia Zhi-yan, and Caiyou, of the plastic net. The plastic net is soft and thus is very convenient to detach and wash.

(3) Mounting of the wet curtain

The wet curtain is mounted in a V shape at the included angle of about 15° by means of the reels. One end of the wet curtain enters the aluminium alloy frame 1 from the reel 6 with a buckle, passes through the plurality of reels, and finally comes out of the reel 10 with a buckle; two ends of the wet curtain are respectively fixed to the reel 6 and the reel 10 by means of their buckles; and the wet curtain is tensioned by rotating the manual handle 9.

(4) Detachment and washing of the wet curtain

The wet curtain is unbuckled from the reel 6 first, then detached by rotating the manual handle 9, and finally buckled from the reel 10 to be removed; and the removed wet curtain is washed in a pool to get rid of dust, scale, algae, mosquitoes, flies, and the like.

(5) Accessary draught fan

The accessary draught fan is required by the wet curtain for the pig farm (the accessary draught fan and the wet curtain are respectively located on the two ends of the pigsty); and the accessary draught fan performs longitudinal ventilation at a negative pressure, that is, the accessary draught fan sucks the air from the outside.

(6) Requirement on water quality

The wet curtain formed by the plastic net has no special requirement on the water quality, and both well water and tap water can be used.

(7) Usage of the wet curtain in the pigsty

The wet curtain needs to be used to lower the temperature in the pigsty when it reaches 28° C. in summer.

The wet curtain in the present disclosure has been used for a pig farm in the Lvye Ecological Park in Jingjiang City, and the effect of the wet curtain in the present disclosure on pig production is compared with that of a traditional wet curtain formed by a honeycomb made from special paper on the pig production in Table 2. In summer, namely a high-temperature season, the wet curtain in the present disclosure has similar cooling effects, and a temperature difference is only about 1° C.; daily gains of pigs have no obvious difference; and mounting, detachment, washing, and replacement costs of the wet curtain in the present disclosure only account for ½ of those of the traditional wet curtain formed by the honeycomb made from the special paper, and the cost of the wet curtain in the present disclosure only accounts for ⅕ of that of the traditional wet curtain formed by the honeycomb made from the special paper.

TABLE 1 comparison of wet curtains

| Item | Structure | Material selection of wet curtains | Mounting | Washing | Accumulation of dust, scale, algae, and mosquitos |
|---|---|---|---|---|---|
| Wet curtain (plastic net) in the present disclosure | Simple | Common materials | Simple | Convenient | Not prone |
| Traditional wet curtain (honeycomb made from special paper) | Complex | Special materials | Complex | Inconvenient | prone |

TABLE 2 comparison of effects on pig production

| Item | Number | Temperature (° C.) in pigsties | Daily gain (g) of pigs | Price (yuan) | Mounting, detachment, washing, and replacement costs |
|---|---|---|---|---|---|
| Wet curtain (plastic net) in the present disclosure | 136 | lower the temperature by 4-6 | 816 | 1/5 | 1/2 |
| Traditional wet curtain (honeycomb made from special paper) | 132 | lower the temperature by 5-7 | 820 | 100-150 | Normal |

What is claimed is:

1. A pig production method by using a detachable and washable wet curtain, comprising:
   producing pigs using the detachable and washable wet curtain;
   the detachable and washable wet curtain comprises a wet curtain mounting frame (1), a spray tube (4), a plurality of rotatable reels (7), a first reel (6) with a first buckle, a wet curtain net (8), a second reel (10) with a second buckle, and a manual handle (9), wherein the spray tube (4) on a top of or above the wet curtain mounting frame (1) is connected to a water inlet tube (5);
   the wet curtain mounting frame (1) is a cuboid 10-20 cm wide, rectangular frames are respectively located on a top and a bottom as well as left and right sides of the wet curtain mounting frame (1), and a bottom plate (2) with a V-shaped groove connected to a water outlet (3) is located at the bottom of the wet curtain mounting frame (1);
   the first reel (6) with the first buckle is fixed to two side borders of the top of the wet curtain mounting frame (1);
   the plurality of rotatable reels (7) are parallelly arranged on a front face and back face of the wet curtain mounting frame (1), and two ends of each rotatable reel (7) are fixed to two side borders of the front face or the back face;
   the second reel (10) with the second buckle has two ends fixed to two side borders of the bottom of the wet curtain mounting frame (1), and is connected to the manual handle (9);
   an upper end of the wet curtain net (8) is fixed to the first reel (6) using the first buckle;
   the wet curtain net (8), after entering the wet curtain mounting frame (1) from the first reel (6) with the first buckle, is continuously wound around the plurality of rotatable reels (7) alternating between the front face and the back face, and a lower end of the wet curtain net (8) is fixed to the second reel (10) with the second buckle (1);
   the wet curtain mounting frame (1) and the bottom plate (2) with a V-shaped groove are made from aluminium alloys; and
   trim strips are adopted as the first and second buckles of the first reel (6) and the second reel (10) to fix the wet curtain; spraying a water from the spray tube (4) such that the water flows through the wet curtain net (8), enters the V-shaped groove in the bottom plate (2), and flows out of the water outlet (3).

2. The pig production method by using the detachable and washable wet curtain according to claim 1, wherein the wet curtain net is a common plastic net or sun-shade net on the market.

3. The pig production method by using the detachable and washable wet curtain according to claim 2, further comprising:
   (1) mounting the wet curtain in a V shape at an included angle of 10°-20° and continuously wound around the plurality of rotatable reels (7) alternating between the front face and the back face, wherein an end of the wet curtain enters the wet curtain mounting frame from the first reel (6) with the first buckle, passes through the plurality of rotatable reels (7), and finally comes out of the second reel (10) with second buckle, two ends of the wet curtain are respectively fixed to the first reel (6) and the second reel (10) using the first and second buckles, and the wet curtain is tensioned by rotating the manual handle (9); and
   (2) detachment and washing of the wet curtain, wherein the wet curtain is unbuckled from the first reel (6) first, then detached by rotating the manual handle (9), and finally unbuckled from the second reel (10) to be removed, and the removed wet curtain is washed in a pool.

4. The pig production method by using the detachable and washable wet curtain according to claim 3, wherein:
   the accessary draught fan is required by the wet curtain for the pig farm;
   the accessary draught fan and the wet curtain are respectively located at the two ends of the pigsty;
   the accessary draught fan sucks the air from the outside; and
   the wet curtain is used to lower the temperature in the pigsty when it reaches 28° C. in summer.

5. The pig production method by using the detachable and washable wet curtain according to claim 2, wherein the wet curtain net (8) is wound around the plurality of rotatable reels (7) at an included angle of 10°-20°.

6. The pig production method by using the detachable and washable wet curtain according to claim 5, wherein:

the accessary draught fan is required by the wet curtain for the pig farm;

the accessary draught fan and the wet curtain are respectively located at the two ends of the pigsty;

the accessary draught fan sucks the air from the outside; and the wet curtain is used to lower the temperature in the pigsty when it reaches 28° C. in summer.

7. The pig production method by using the detachable and washable wet curtain according to claim 2, wherein:

an accessary draught fan is required by the wet curtain for a pig farm;

the accessary draught fan and the wet curtain are respectively located at two ends of a pigsty;

the accessary draught fan blows air out of the pigsty; and the wet curtain is used to lower a temperature in the pigsty when it reaches 28° C. in summer.

8. The pig production method by using the detachable and washable wet curtain according to claim 1, further comprising:

(1) mounting the wet curtain in a V shape at an included angle of 10°-20° and continuously wound around the plurality of reels (7) alternating between the front face and the back face, wherein an end of the wet curtain enters the wet curtain mounting frame from the first reel (6) with the first buckle, passes through the plurality of reels (7), and finally comes out of the second reel (10) with the second buckle, two ends of the wet curtain are respectively fixed to the first reel (6) and the second reel (10) using the first and second buckles, and the wet curtain is tensioned by rotating the manual handle (9); and (2) detachment and washing of the wet curtain, wherein the wet curtain is unbuckled from the first reel (6) first, then detached by rotating the manual handle (9), and finally unbuckled from the second reel (10) to be removed, and the removed wet curtain is washed in a pool.

9. The pig production method by using the detachable and washable wet curtain according to claim 8, wherein:

an accessary draught fan is required by the wet curtain for a pig farm;

the accessary draught fan and the wet curtain are respectively located at two ends of a pigsty;

the accessary draught fan blows air out of the pigsty; and the wet curtain is used to lower a temperature in the pigsty when it reaches 28° C. in summer.

10. The pig production method by using the detachable and washable wet curtain according to claim 8, wherein the wet curtain net (8) is wound around the plurality of rotatable reels (7) at the included angle of 10°-20°.

11. The pig production method by using the detachable and washable wet curtain according to claim 10, wherein:

the accessary draught fan is required by the wet curtain for the pig farm;

the accessary draught fan and the wet curtain are respectively located at the two ends of the pigsty;

the accessary draught fan sucks the air from the outside; and the wet curtain is used to lower the temperature in the pigsty when it reaches 28° C. in summer.

12. The pig production method by using the detachable and washable wet curtain according to claim 1, wherein the wet curtain net (8) is wound around the plurality of rotatable reels (7) at an included angle of 10°-20°.

13. The pig production method by using the detachable and washable wet curtain according to claim 12, wherein:

an accessary draught fan is required by the wet curtain for a pig farm;

the accessary draught fan and the wet curtain are respectively located at two ends of a pigsty;

the accessary draught fan blows air out of the pigsty; and the wet curtain is used to lower a temperature in the pigsty when it reaches 28° C. in summer.

14. The pig production method by using the detachable and washable wet curtain according to claim 1, wherein:

an accessary draught fan is required by the wet curtain for a pig farm;

the accessary draught fan and the wet curtain are respectively located at two ends of a pigsty;

the accessary draught fan blows air out of the pigsty; and the wet curtain is used to lower a temperature in the pigsty when it reaches 28° C. in summer.

15. A detachable and washable wet curtain configured for a pigsty comprising:

a wet curtain mounting frame (1), a spray tube (4), a plurality of rotatable reels (7), a first reel (6) with a first buckle, a wet curtain net (8), a second reel (10) with a second buckle, and a manual handle (9), wherein the spray tube (4) on a top of or above the wet curtain mounting frame (1) is connected to a water inlet tube (5);

the wet curtain mounting frame (1) is a cuboid 10-20 cm wide, rectangular frames are respectively located on the top and a bottom as well as left and right sides of the wet curtain mounting frame (1), and a bottom plate (2) with a V-shaped groove connected to a water outlet (3) is located at the bottom of the wet curtain mounting frame (1);

the first reel (6) with the first buckle is fixed to two side borders of the top of the wet curtain mounting frame (1);

the plurality of rotatable reels (7) are parallelly arranged on a front face and back face of the wet curtain mounting frame (1), and two ends of each said rotatable reel (7) are fixed to two side borders of the front face or the back face;

the second reel (10) with second buckle has two ends fixed to two side borders of the bottom of the wet curtain mounting frame (1), and is connected to the manual handle (9);

an upper end of the wet curtain net (8) is fixed to the first reel (6) using the first buckle;

the wet curtain net (8), after entering the wet curtain mounting frame (1) from the first reel (6) with the first buckle, is continuously wound around the plurality of rotatable reels (7) alternating between the front face and the back face, and a lower end of the wet curtain net (8) is fixed to the second reel (10) with the second buckle;

the wet curtain mounting frame (1) and the bottom plate (2) with a V-shaped groove are made from aluminium alloys; and trim strips are adopted as the first and second buckles of the first reel (6) and the second reel (10) to fix the wet curtain.

16. The detachable and washable wet curtain according to claim 15, wherein the wet curtain net (8) is wound around the plurality of rotatable reels (7) at an included angle of 10°-20°.

17. The detachable and washable wet curtain according to claim 15, further comprising:

an accessary draught fan;

the accessary draught fan and the wet curtain are respectively located at two ends of a pigsty;
the accessary draught fan blows air out of the pigsty; and
the wet curtain is used to lower a temperature in the pigsty when it reaches 28° C. in summer.

\* \* \* \* \*